United States Patent
Stuart et al.

(10) Patent No.: US 12,548,455 B2
(45) Date of Patent: Feb. 10, 2026

(54) GROUND-BASED CONTENT CURATION PLATFORM DISTRIBUTING GEOGRAPHICALLY-RELEVANT CONTENT TO AIRCRAFT INFLIGHT ENTERTAINMENT SYSTEMS

(71) Applicant: Thales Avionics, Inc., Irvine, CA (US)

(72) Inventors: Margaret Stuart, Mission Viejo, CA (US); Maneesha Sumien, Mission Viejo, CA (US); Peter Hong, Irvine, CA (US)

(73) Assignee: Thales Avionics, Inc., Irvine, CA (US)

( * ) Notice: Subject to any disclaimer, the term of this patent is extended or adjusted under 35 U.S.C. 154(b) by 441 days.

(21) Appl. No.: 17/553,353

(22) Filed: Dec. 16, 2021

(65) Prior Publication Data

US 2023/0196925 A1 Jun. 22, 2023

(51) Int. Cl.
| | |
|---|---|
| *H04N 21/214* | (2011.01) |
| *B64D 11/00* | (2006.01) |
| *G08G 5/55* | (2025.01) |
| *G08G 5/59* | (2025.01) |
| *H04N 21/258* | (2011.01) |
| *H04N 21/414* | (2011.01) |

(52) U.S. Cl.
CPC ........... *G08G 5/55* (2025.01); *B64D 11/0015* (2013.01); *G08G 5/59* (2025.01); *H04N 21/2146* (2013.01); *H04N 21/25841* (2013.01); *H04N 21/41422* (2013.01)

(58) Field of Classification Search
None
See application file for complete search history.

(56) References Cited

U.S. PATENT DOCUMENTS

| 6,810,527 | B1 | 10/2004 | Conrad et al. | |
|---|---|---|---|---|
| 2011/0283322 | A1* | 11/2011 | Hamano | H04N 21/47 725/44 |
| 2012/0030708 | A1 | 2/2012 | Margis et al. | |
| 2012/0099514 | A1* | 4/2012 | Bianchetti | H04N 21/47202 370/312 |

(Continued)

OTHER PUBLICATIONS

International Search Report and Written Opinion of the International Searching Authority for PCT Application No. PCT/US22/52205 mailed Mar. 7, 2023.

(Continued)

*Primary Examiner* — Jason K Lin
(74) *Attorney, Agent, or Firm* — Sage Patent Group (57) ABSTRACT

A ground-based content curation platform identifies geographically-relevant content having metadata indicating a geographic relevance area which satisfies a relevance rule relative to the present location of the aircraft. The platform distributes the geographically-relevant content to an IFE system of the aircraft for local storage and access by passengers, wherein the geographically-relevant content is distributed through the at least one network interface and routed through a satellite radio communication system or a terrestrial radio communications system. The platform repeats the identification of geographically-relevant content and the distribution of the geographically-relevant content to initiate replacement of the geographically-relevant content at the IFE system, based on a threshold change in location of the aircraft.

14 Claims, 9 Drawing Sheets

(56) References Cited

U.S. PATENT DOCUMENTS

| | | | |
|---|---|---|---|
| 2012/0232782 A1* | 9/2012 | Sterkel | H04H 20/62 |
| | | | 701/409 |
| 2012/0232791 A1 | 9/2012 | Sterkel et al. | |
| 2014/0123161 A1* | 5/2014 | van Coppenolle | ........................ |
| | | | H04N 21/2543 |
| | | | 725/8 |
| 2017/0223080 A1* | 8/2017 | Velayudhan | H04L 65/612 |
| 2022/0060759 A1* | 2/2022 | Fowler | H04N 21/2146 |

OTHER PUBLICATIONS

European Search Report for European Patent Application No. 22908253.2 dated Mar. 19, 2025, 12 pages.

* cited by examiner

GROUND-BASED CONTENT CURATION PLATFORM DISTRIBUTING GEOGRAPHICALLY-RELEVANT CONTENT TO AIRCRAFT INFLIGHT ENTERTAINMENT SYSTEMS

TECHNICAL FIELD

Embodiments described herein relate generally to aircraft inflight entertainment systems for passengers and, more particularly, to distributing content to aircraft inflight entertainment systems through satellite or terrestrial radio communication systems.

BACKGROUND

Inflight entertainment (IFE) systems are deployed onboard aircraft to provide entertainment services for passengers in a passenger cabin. The IFE systems typically distribute on-demand and/or streaming channels of movie, television, audio, electronic publications, and gaming entertainment programming to passenger-operated electronic communication devices. The passenger-operated electronic communication devices can include, without limitation, seat video units which are mounted to individual seats, e.g., seatbacks or armrests, and/or passenger-owned electronic devices (PEDs) transported onboard aircraft.

IFE systems typically make content available for passengers from an onboard library. Selection of content to be made available can be based on locally driven content licensing criteria, box office ratings, TV ratings, and "usage data" captured by IFE systems across a fleet of aircraft. Usage data indicates what content was used by passengers during earlier flights. Usage data can provide a relatively limited understanding of content usage, such as the number of times and duration content was viewed during various flights, and what particular content may be interesting to a particular passenger.

Content selection processes can result in a relatively static selection of content being made available to passengers. Passenger satisfaction with a flight experience and, ultimately, with an airline can be significantly impacted by what content is made available through an IFE system. For example, frequent flyers can get bored very quickly if the content is not refreshed regularly.

SUMMARY

Various embodiments of the present disclosure are directed to a ground-based content curation platform that can dynamically link passengers with content that is geographically-relevant to where their aircraft is presently located. The content can be rapidly updated as the aircraft flies along a route so that new content is made available to passengers as an aircraft enters a new geographically-relevant area, and no-longer geographically-relevant content can be removed from availability to passengers dynamically. These and other operations may emulate the natural fleeting connections that travelers have experienced as they traveled through towns, cities, and landscapes using land based modes of transportation. It is anticipated that the rapid updating of geographically-relevant content will provide a captivating and enjoyable experience for passengers, which is anticipated to increase their satisfaction with the flight and ultimately the airline. Moreover, linking passengers in this manner to geographically-relevant content may enable new revenue and publicity generating opportunities for the airlines and for businesses that are associated with those geographically-relevant areas.

In one embodiment, a ground-based content curation platform includes at least one network interface, at least one processor connected communicate through the at least one network interface, and at least one memory storing instructions executable by the at least one processor to perform operations. The operations identify geographically-relevant content having metadata indicating a geographic relevance area which satisfies a relevance rule relative to the present location of the aircraft. The operations distribute the geographically-relevant content to an IFE system of the aircraft for local storage and access by passengers, wherein the geographically-relevant content is distributed through the at least one network interface and routed through a satellite radio communication system or a terrestrial radio communications system. The operations repeat the identification of geographically-relevant content and the distribution of the geographically-relevant content to initiate replacement of the geographically-relevant content at the IFE system, based on a threshold change in location of the aircraft. The thresholds can be configured based on the aircraft's size and speed to ensure an appropriate level of content refreshing.

Other content curation platforms and related methods and computer program products according to embodiments of the invention will be or become apparent to one with skill in the art upon review of the following drawings and detailed description. It is intended that all such additional content curation platforms, methods and computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiments of the invention. In the drawings.

DETAILED DESCRIPTION

The following detailed description discloses various non-limiting example embodiments of the invention. The invention can be embodied in many different forms and is not to be construed as limited to the embodiments set forth herein.

As airplane travel became the predominant mode of transportation for distances over several hundred miles and as aircraft became more technically advanced and able to fly with greater fuel-efficiency and comfort at much higher altitudes, passengers effectively lost all connections with the towns, cities, and landscapes over which they traveled. Various embodiments of the present disclosure arise from a desire to emulate the natural fleeting connections that travelers have traditionally experienced as they traveled through towns, cities, and landscapes using land based modes of transportation, and to enhance the passenger experience through interaction with those connections.

Some embodiments of the present disclosure are directed to a ground-based content curation platform that can dynamically link passengers with content that is geographically-relevant to where their aircraft is presently located through a configurable and defined ground area. The content can be rapidly updated as the aircraft flies along a route so that new content is made available to passengers as aircraft enters a new geographically-relevant area, and no-longer geographically-relevant content can be removed from availability to passengers. It is anticipated that the rapid updating of geographically-relevant content will provide a captivating enjoyable experience for passengers, which may increase their satisfaction with the flight and ultimately the airline. Moreover, as will be explained in further detail below, linking passengers in this manner may enable new revenue and publicity generating opportunities for the airlines, IFE suppliers, and any businesses that are associated with those geographically-relevant areas.

Figure 1:
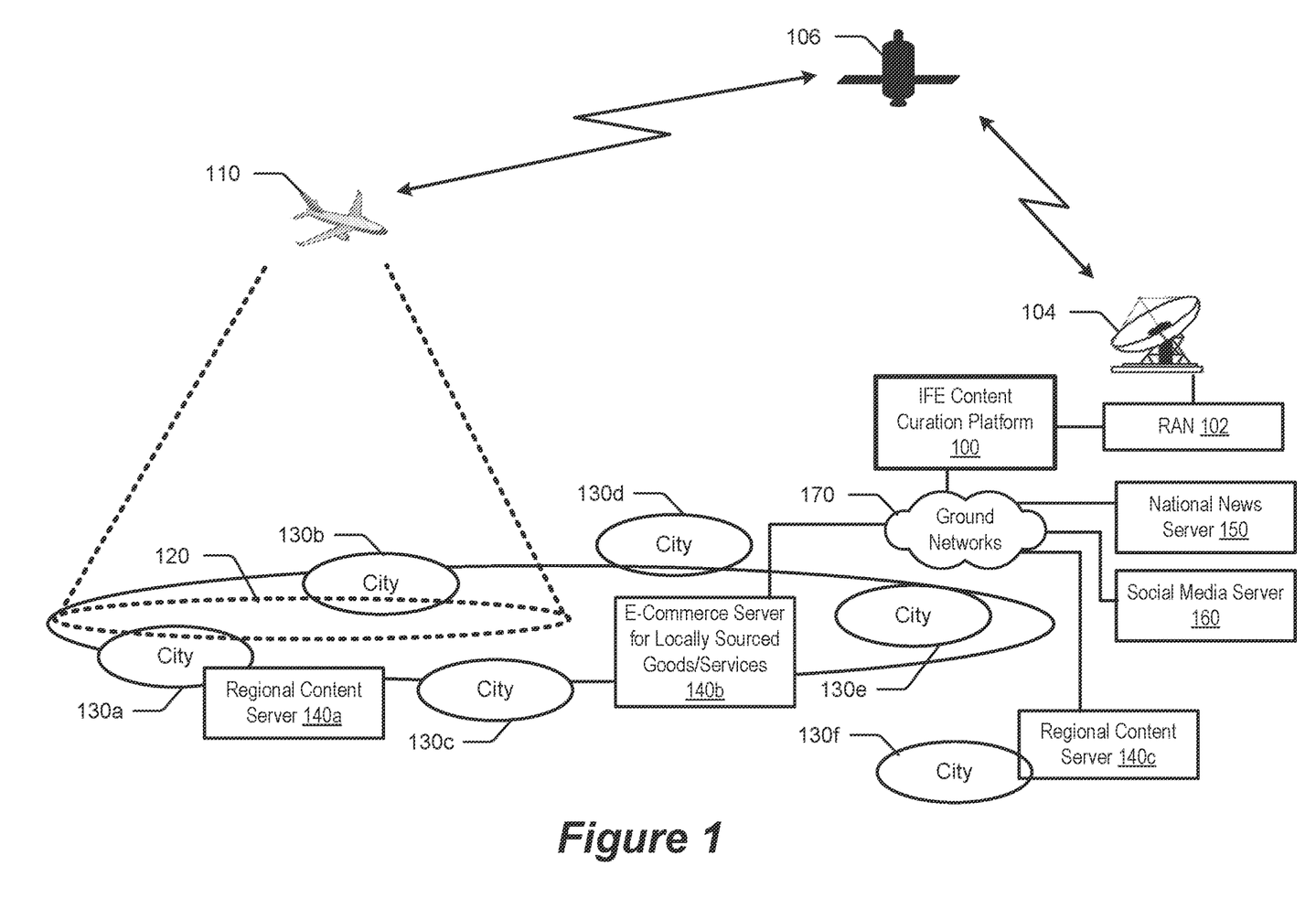
FIG. 1 illustrates a system that includes a ground-based content curation platform which distributes geographically-relevant content to an IFE system onboard an aircraft based on present location of the aircraft, in accordance with some embodiments.

FIG. 1 illustrates a system that includes a ground-based content curation platform 100 which distributes geographically-relevant content to an IFE system onboard an aircraft 110 based on a present location of the aircraft 110, in accordance with some embodiments.

Referring to FIG. 1, the ground-based content curation platform ("content curation platform") 100 is configured to use the present location of the aircraft 110 to identify geographically-relevant content in servers that can be geographically distributed across a country. In the simplified example of FIG. 1, the content curation platform 100 can identify and obtain through ground networks 170, e.g., via Internet and/or private networks, geographically-relevant content from a plurality of regional content servers 140a and 140c, an e-Commerce server 140b offering locally sourced goods and/or services, a national news server 150, and a social media server 160. The regional content server 140a may, for example, be focused on providing content that is geographically-relevant to three cities 130a-130c which may be in a same state or region. The regional content server 140c may be focused on providing content is geographically-relevant to three other cities 130d-130f. The e-Commerce server 140b may offer locally sourced goods and/or services that are sourced in a particular town, city, or region. The content curation platform 100 may determine that the regional content server 140a has content which is specifically relevant to cities 130a and 130b which are determined to be within a threshold range of the present location of the aircraft 106, and may responsive select that specifical content for distribution to the IFE system of the aircraft 110.

The content curation platform 100 can distribute the identified geographically-relevant content to the IFE system of the aircraft 110 through a terrestrial radio communications system or a satellite radio communication system. FIG. 1 illustrates an example scenario where the content curation platform 100 distributes identified geographically-relevant content to the IFE system through a radio access network 102, a satellite gateway 104, and a satellite 106 which may be, for example, part of a geostationary satellite constellation, a medium Earth orbit satellite constellation, or a low Earth orbit satellite constellation.

FIG. 1 also illustrates that the aircraft 110 is presently traveling along a flight ground segment 120 which overlaps two cities 130a and 130b. The content curation platform 100 may compute the flight ground segment 120 based on the present location of the aircraft 110, the present ground speed, and the present heading. Although various embodiments are discussed in the context of using the present aircraft location for identifying geographically-relevant content, the term present aircraft location as used in various operational embodiments disclosed herein can include the present flight ground segment.

Figure 2:
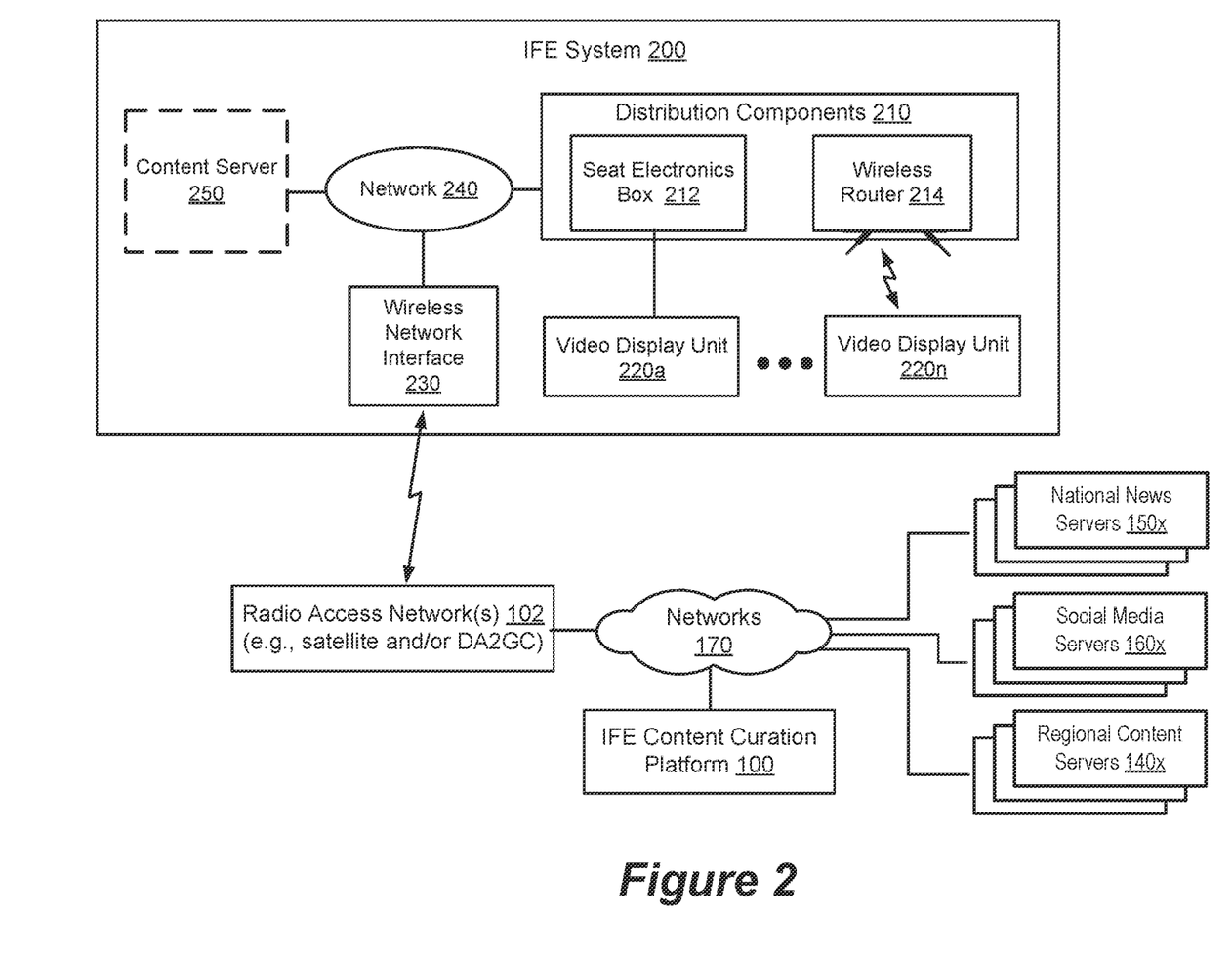
FIG. 2 illustrates a block diagram of an IFE system that receives geographically-relevant content from the ground-based content curation platform of FIG. 1 for distribution to passengers, in accordance with some embodiments.

FIG. 2 illustrates a block diagram of an IFE system 200 that receives geographically-relevant content from the ground-based content curation platform 100 of FIG. 1 for distribution to passengers, in accordance with some embodiments. Referring to FIG. 2, the IFE system 200 includes video display units (VDUs) 200a-n and distribution components 210. The VDUs 200a-n can include, without limitation, seat video units which are mounted to individual seats, e.g., seatbacks or armrests, and/or passenger-owned electronic devices (PEDs) transported onboard aircraft. Example PEDs include, without limitation, cellular phones, tablet computers, and laptop computers. The distribution components 210 can include a wireless router 214, e.g., WiFi access point and/or cellular access point (e.g. a picocell radio base station), seat electronics boxes 212 or other aircraft mounted units, and wired networks 240 such as Ethernet. The IFE system 200 may include a content server 250 which can provide on-demand distribution of passenger-requested content to through the VDUs 220a-n. The IFE system 200 receives geographically-relevant content through a wireless network interface 230, which may correspond to a satellite antenna and transceiver, a terrestrial antenna and transceiver, etc.

Example types of geographically-relevant content that can be provided by the content curation platform 100 to the IFE system 200 for distribution to passengers can include, but are not limited to:
1) products offered by businesses through e-Commerce which are located in the geographically-relevant area that the aircraft is currently flying through or flying to;
2) services offered by businesses through e-Commerce which are located in the geographically-relevant area;
3) local news for a geographically-relevant area;
4) local television programming broadcast within the geographically-relevant area;
5) radio programming broadcast within the geographically-relevant area;
6) local community access website content for a geographically-relevant area;
7) social media site content for a geographically-relevant area;
8) descriptions of points of interest relating to the geographically-relevant area;
9) pictures and/or video of landscapes, buildings, geography, people, events, etc. captured in a geographically-relevant area.

The IFE system and/or the content curation platform 100 may be configured to enable passengers to communicate with each other and/or persons offboard the aircraft 110 regarding the geographically-relevant content, such as discuss the points of interest, pictures and/or video of landscapes, social media content, etc.

Operations described herein as being performed by the content curation platform 100 may be performed by any capable computer hardware and software architecture, such as a single server or a networked group of servers. For example, one server may be primarily responsible for identifying geographically-relevant content that can satisfy certain rule(s) for distribution to an IFE system of a particular aircraft, another server may be primarily responsible for filtering and formatting the candidate geographically-relevant content to generate content which is ready to be distributed to the IFE system, and yet another server may be primarily responsible for distributing the filtered and formatted content to the IFE system of the particular aircraft through the satellite radio communication system or the terrestrial radio communications system. Yet another server may be primarily responsible for generating and tracking monetization opportunities for the airline and/or other party, such as by selecting content of entities who have pre-established business relationships with the airline or other contracting party and satisfy a rule for having content, e.g., locally sourced products and/or services, which satisfies a rule for the content to become geographically-relevant to the present location of the aircraft.

The content server 250 may be configured to temporarily store the received geographically-relevant content, make passengers aware of the temporarily available geographically-relevant content, and distribute some of the content to passengers based on their requests and/or based on defined preferences associated with the passengers (e.g., defined as part of a passenger's aircraft account information and/or observations of a passenger's earlier content consumption preferences).

Although the system of FIG. 1 includes a content server 250, the IFE system 200 is not limited thereto. The geographically-relevant content may be provided directly to the VDUs 220a-220n through, for example, streaming content channel(s) that is(are) selectable by the VDUs 220a-200n and/or as content that can be selectively requested by passengers using a user interface of the VDUs 220a-200n.

Figure 3:
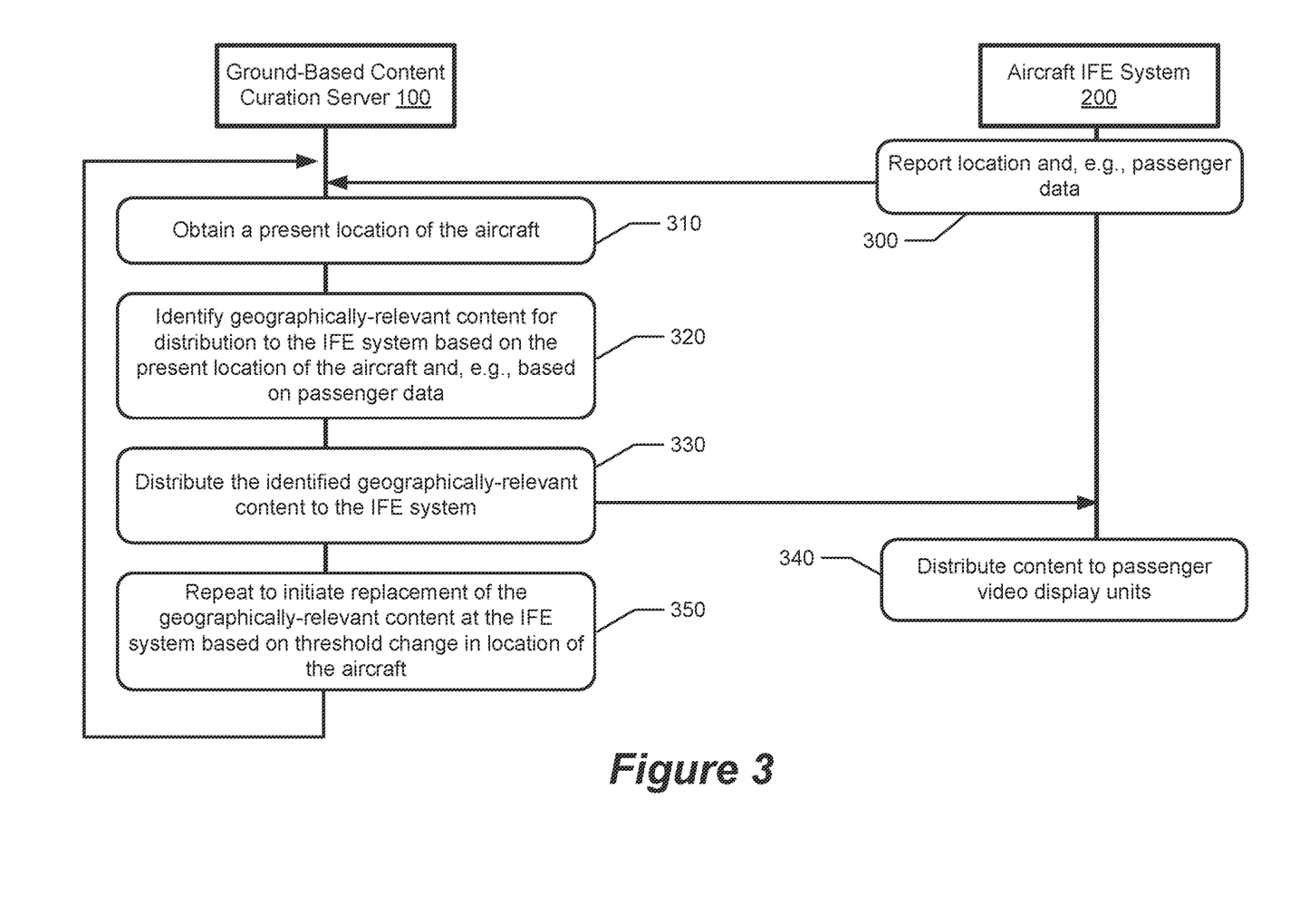
FIG. 3 illustrates flowcharts and data flows of the ground-based content curation platform of FIG. 1 and the IFE system of FIG. 2, in accordance with some embodiments.

FIG. 3 illustrates flowcharts and data flows of the ground-based content curation platform 100 of FIG. 1 and the IFE system 200 of FIG. 2, in accordance with some embodiments.

Referring to FIG. 3, the content curation platform 100 obtains 310 a present location of the aircraft 110. The present location may be reported 300 by the IFE system 200 onboard the aircraft 110. The IFE system may also report other information that can be used for selecting content, such as passenger information data within the transparency requirements of any controlling data privacy relevant regulations, the time of day, etc. The passenger information data can include, without limitation: passenger identities; passenger demographics; passenger content consumption preferences; passenger content consumption history; number of passengers on board the aircraft 110; etc.

The content curation platform 100 identifies 320 geographically-relevant content having metadata indicating a geographic relevance area which satisfies a relevance rule relative to the present location of the aircraft 110. The content curation platform 100 then distributes the geographically-relevant content to the IFE system 200 system of the aircraft 110 for local storage and access by passengers. The geographically-relevant content is distributed through at least one network interface and routed through a satellite radio communication system, e.g., RAN 102, gateway 104, and satellite 106 in FIG. 1, or a terrestrial radio communications system. The IFE system 200 receives and distributes 340 the geographically-relevant content to the passengers via the VDUs 220a-220n. The content may be streamed through channels that are selectable by passengers, may be provided on-demand to passengers, and/or may be otherwise displayed and/or audible played-out to passengers. Accordingly, the local storage of the geographically-relevant content onboard the aircraft may correspond to temporarily storing in the content server 250 for streaming and/or on-demand delivery to passengers, or may correspond to temporarily buffering the content in, e.g., a buffer connected to a radio receiver awaiting distribution to one or more passengers or temporarily making the relevant content visible until its expiration date is reached.

The content curation platform 100 repeats 350 the identification 320 of geographically-relevant content and the distribution 330 of the geographically-relevant content to initiate replacement of the geographically-relevant content at the IFE system, based on obtaining 310 an updated location having a threshold change in location of the aircraft 110. In this manner, the content can be rapidly updated as the aircraft 110 flies along a route so that new content is made available to passengers as the aircraft 110 enters a new geographically-relevant area, and no-longer geographically-relevant content can be removed from availability to passengers.

Various further operations that may be performed by the content curation platform 100 are now described in the context of the flowcharts of FIGS. 4 to 11, in accordance with some embodiments.

When the geographically-relevant content is temporarily stored onboard the aircraft, such as by the content server 250, the content curation platform 100 may notify the IFE system 200 when certain content is to be removed from storage so that it is no longer available for consumption by passengers, or when the certain content is to no longer be made available by the IFE system 200 for selection by passengers who aren't yet consuming the content but while allowing passengers who were already consuming the content to continue to consume (e.g., for up to a threshold additional time).

In one embodiment, the content curation platform 100 sends a message to the IFE system 200 to initiate removal or disabling of the geographically-relevant content from the local storage and terminate access by the passengers, responsive to an updated location of the aircraft 110 no longer satisfying the relevance rule relative to the geographic relevance area of the geographically-relevant content. In a further embodiment, the content curation platform 100 computes a threshold time the content is to be available for access by the passengers through the IFE system 200, based on present aircraft ground speed. The operation to send the message to the IFE system 200 of the aircraft 100 to initiate removal or disabling of the geographically-relevant content from the local storage and terminate access by the passengers, is further based on expiration of the threshold time.

Figure 4:
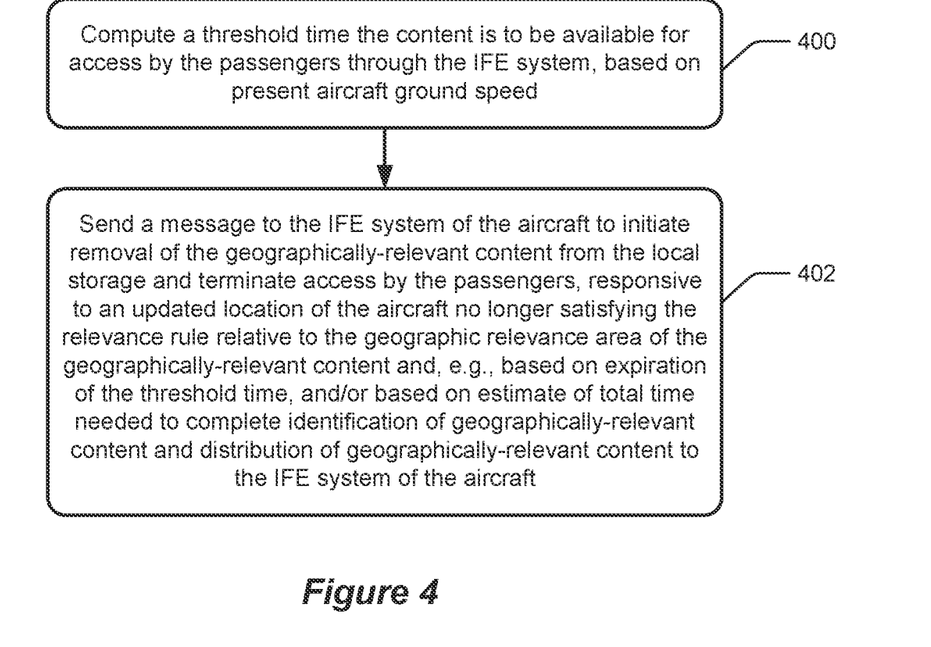
FIGS. 4 to 11 illustrate flowcharts of operations and methods that may be performed by a ground-based content curation platform, in accordance with some embodiments.

In another particular embodiment illustrated in FIG. 4, the content curation platform 100 computes 400 a threshold time the content is to be available for access by the passengers through the IFE system, based on present aircraft ground speed. The content curation platform 100 sends 402 a message to the IFE system 200 of the aircraft 110 to initiate removal or disabling of the geographically-relevant content from the local storage and terminate access by the passengers, responsive to an updated location of the aircraft no longer satisfying the relevance rule relative to the geographic relevance area of the geographically-relevant content, based on expiration of the threshold time, and based on an estimate of total time needed to complete identification of geographically-relevant content (e.g., querying content server(s) to identify geographically-relevant content) and distribution of geographically-relevant content to the IFE system 200 of the aircraft 100.

Selection and Filtering of Geographically-Relevant Content for Aircraft:

Various operations that may be performed by the content curation platform 100 to identify and possibly filter geographically-relevant content for distribution to the IFE system 200 base on the present location of the aircraft 100 are now described with regard to FIGS. 5 to 10.

Content may be identified as being geographically-relevant to the aircraft based on when a ground segment computed for the aircraft intersects a geographic relevance area indicated by metadata associated with the content. In one embodiment, the content curation platform 100 computes a ground segment based on the present location of the aircraft 110 and a flight path of the aircraft 110. The content curation platform 100 then identifies the geographically-relevant content based on the metadata indicating a geographic relevance area which is intersected by the ground segment. The content curation platform 100 initiates replacement of the geographically-relevant content at the IFE system 200 based on the geographic relevance area not being intersected by an updated ground segment computed based on an updated location of the aircraft 110 and an updated flight path of the aircraft 110.

Content may be identified as being geographically-relevant to the aircraft using a search engine which queries content servers using geographic search term(s) which are determined based on the present location of the aircraft. In the embodiment illustrated in FIG. 5, the content curation platform 100 determines 500 at least one geographic search term based on the present location of the aircraft 100, and operates 502 a search engine to query content servers using the determined at least one geographic search term to identify geographically-relevant content for distribution to the IFE system 200 of the aircraft 100.

Figure 5:
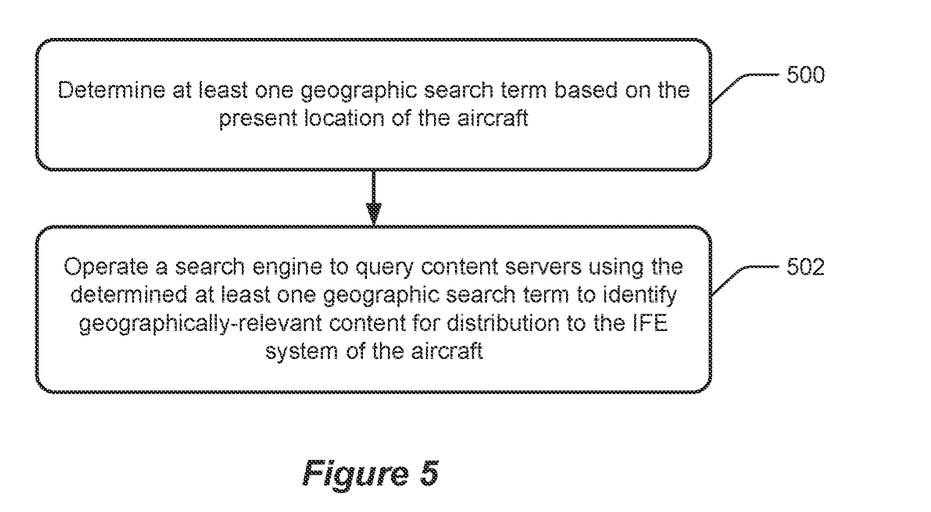

The content curation platform 100 may generate the geographic search term(s) based on processing the present location of the aircraft 110 through one or more hierarchical rules which map locations to geographic search term(s). The content curation platform 100 may selectively perform repetitive queries of the server(s) using different geographic search term(s) corresponding to increasingly wider geographical areas until the query search results satisfy a defined rule for being sufficient in variety and geographic relevance for distribution to the IFE system 200.

For example, when the aircraft 110 is within a threshold distance of City A which is determined be within Region B (e.g., county, western-Rockies near Boulder, etc.) of State C, the content curation platform 100 may generate search terms that include "City A", "Region B", and "State C", and may query content server(s) using one or more of the search terms. The search terms may additionally or alternatively be selected based on other keywords which are defined or determined to be geographically-relevant to the present location of the aircraft 110. In an illustrative simplified example, the content curation platform 100 may perform a first query containing the search term "City A" and, when the first query content results satisfy a defined rule, the first query content results can be prepared for distribution to the IFE system 200. In contrast, when the first query does not return sufficient results satisfying the defined rule, the content curation platform 100 may perform a second query containing the search term "Region B" and, when the second query content results satisfy the defined rule, the first and second query content results can be prepared for distribution to the IFE system 200. With further contrast, when the second query does not return sufficient results satisfying the defined rule, the content curation platform 100 may perform a third query containing the search term "State C" and, when the third query content results satisfy the defined rule, the first, second, and third query content results can be prepared for distribution to the IFE system 200.

The content curation platform 100 may select which content server is to be queried. In a further embodiment, the content curation platform 100 selects a content server from among a list of content servers based on the selected content server having metadata indicating a geographic relevance area which satisfies the relevance rule relative to the present location of the aircraft. The content curation platform 100 then queries the selected content server to select the geographically-relevant content for distribution to the IFE system of the aircraft.

As was explained above, any type of content server can be queried to identify geographically-relevant content for distribution to the IFE system 200. In one example embodiment, the content curation platform 100 identifies geographically-relevant content for distribution to the IFE system 200 of the aircraft 100 by using the determined at least one geographic search term to query online publications site servers (e.g., news sites), Resource Description Framework (RDF) Site Summary (RSS) web feed servers, social media site servers, and/or photo sharing site servers.

Filtering Search Results Before Distribution:

Various operations are now described which may be performed by the content curation platform 100 to filter and prepare the identified geographically-relevant content for distribution to the IFE system 200.

Figure 6:
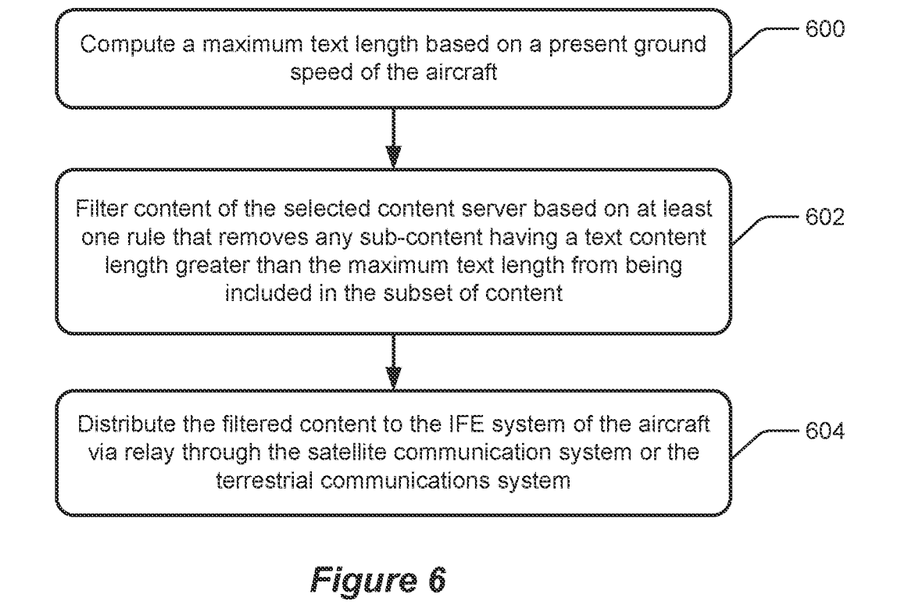

In the illustrative embodiment of FIG. 6, the content curation platform 100 computes 600 a maximum text length based on a present ground speed of the aircraft 110. The content curation platform 100 filters 602 content of the selected content server based on at least one rule that removes any sub-content having a text content length greater than the maximum text length from being included in the subset of content. The content curation platform 100 then distributes 604 the filtered content to the IFE system 200 of the aircraft 100 via relay through the satellite communication system or the terrestrial communications system.

The above operations can thereby reduce the size of content that is distributed to the aircraft in order to reduce or limit consumption of radio communication resources and associated content storage capacity of the IFE system 200. The above operations can also enable content to be more quickly presented and removed to force a continual replacement of fresh content reflecting updated geographic relevance to updated location(s) of the aircraft 110. The content curation platform 100 may, for example, distribute a shortened filtered set of content to the IFE system 200, and may subsequently distribute an unfiltered item of the set of content responsive to a message from the IFE system 200 indication selection of that item by a passenger and/or indicating an express request from the passenger to view the entirety of the content.

Figure 7:
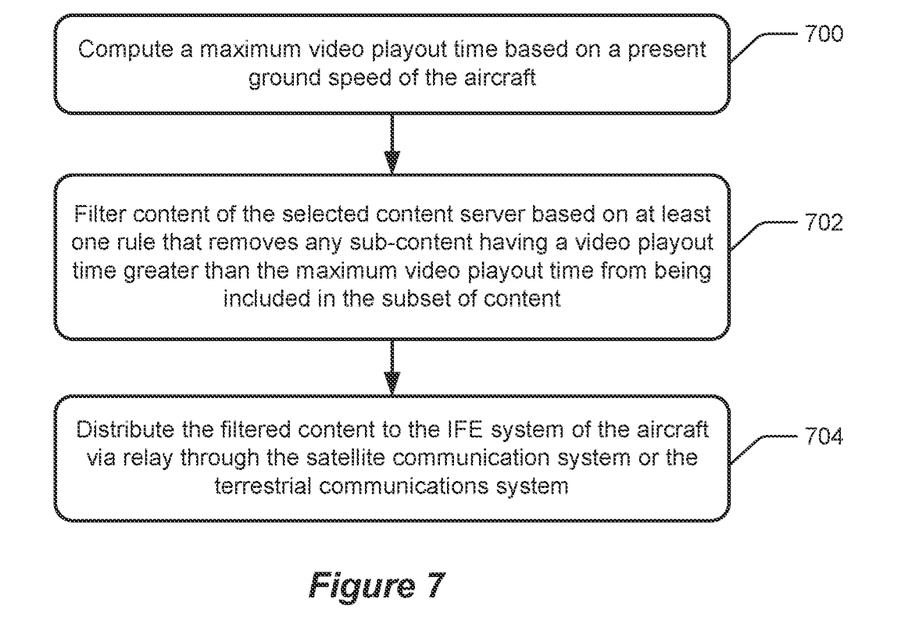
Figure 8:
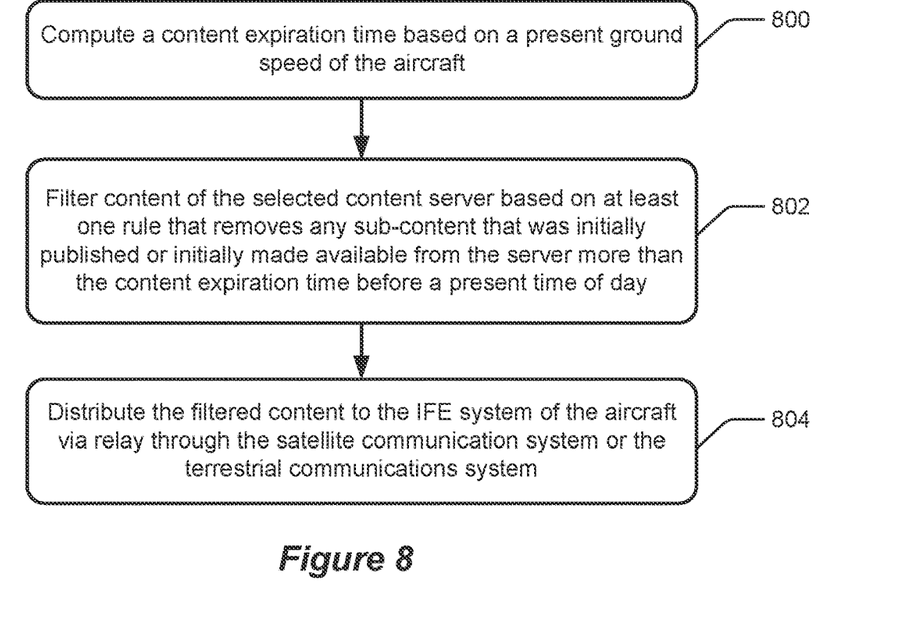

In the illustrative embodiment of FIG. 7, the content curation platform 100 computes 700 a maximum video playout time based on a present ground speed of the aircraft 110. The content curation platform 100 filters 702 content of the selected content server based on at least one rule that removes any sub-content having a video playout time greater than the maximum video playout time from being included in the subset of content. The content curation platform 100 then distributes 704 the filtered content to the IFE system 200 of the aircraft 100 via relay through the satellite communication system or the terrestrial communications system FIG. 8 illustrates other operations that may be performed to provide fresh content that is geographically-relevant to the present location of the aircraft 110. Referring to FIG. 8, a content expiration time is computed 800 based on a present ground speed of the aircraft. Content of the selected content server is filtered 802 based on at least one rule that removes any sub-content that was initially published or initially made available from the server more than the content expiration time before a present time of day. The filtered content is distributed 804 to the IFE system 200 of the aircraft 100 via relay through the satellite communication system or the terrestrial communications system.

Selection of Geographically-Relevant Gaming Content:

The content curation platform 100 may be configured to identify geographically-relevant gaming content for distribution to the IFE system 200. The gaming content may be used to provide various types of games having content that is geographically-relevant to the present location of the aircraft 110. An example game can include an interactive trivia game environment for passengers, where the IFE system 200 is provided questions (e.g., textual descriptions and/or photos) and associated answers which are geographically-relevant to the present location of the aircraft 110.

Figure 9:
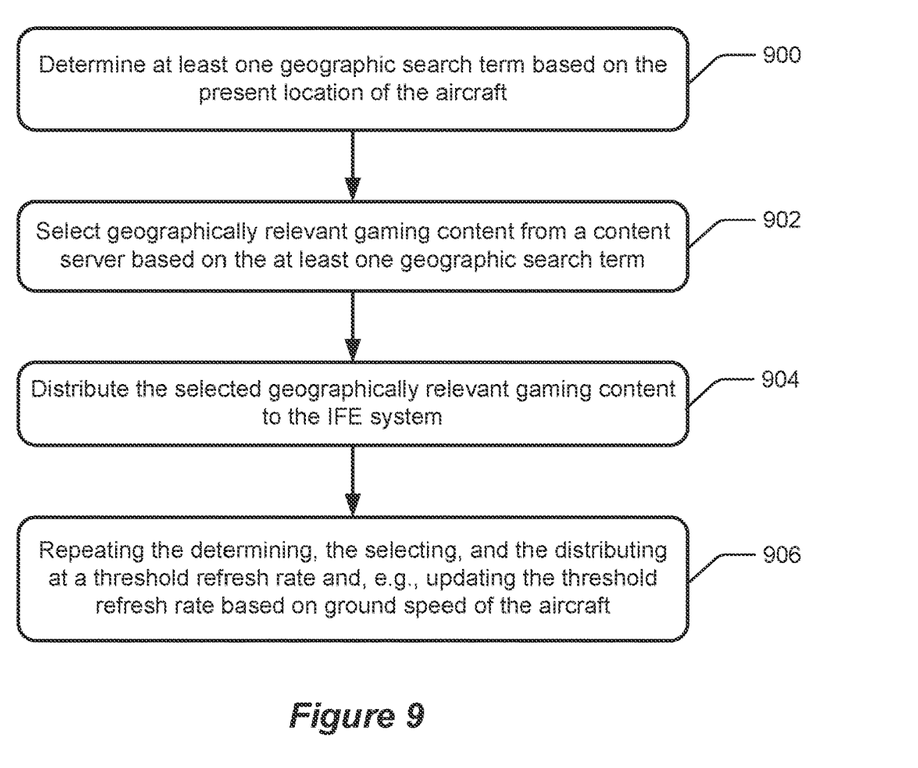

In the context of a trivia game environment, passengers may play again a computer and/or other passengers to correctly answer questions regarding geography, points of interest, local news, local culture, and other location information that is derived from the selected 902 geographically-relevant gaming content. Passengers may compete to win onboard or offboard prizes, such as products or services. The trivia game environment may be particularly enticing to passengers in view of its rapidly changing geographic focus which is tied in real-time to the passengers' ongoing journey.

In the embodiment of FIG. 9, the content curation platform 100 determines 900 at least one geographic search term based on the present location of the aircraft. The content curation platform 100 selects 902 geographically-relevant gaming content from a content server based on the at least one geographic search term. The content curation platform 100 distributes 904 the selected geographically-relevant gaming content to the IFE system 200. The operations for the determining 900, the selecting 902, and the distributing 904 can be repeated 906 at a threshold refresh rate. The threshold refresh rate may be updated (computed) based on an updated ground speed of the aircraft.

Selection of Locally-Sourced e-Commerce Offerings Content:

The content curation platform 100 may be configured to provide content that is associated with e-Commerce offerings for products and/or services which are locally sourced, relative to the aircraft location, by entities who may, as a precondition for selection, be required to have pre-established business relationships with the airline and/or other contracting party.

Figure 10:
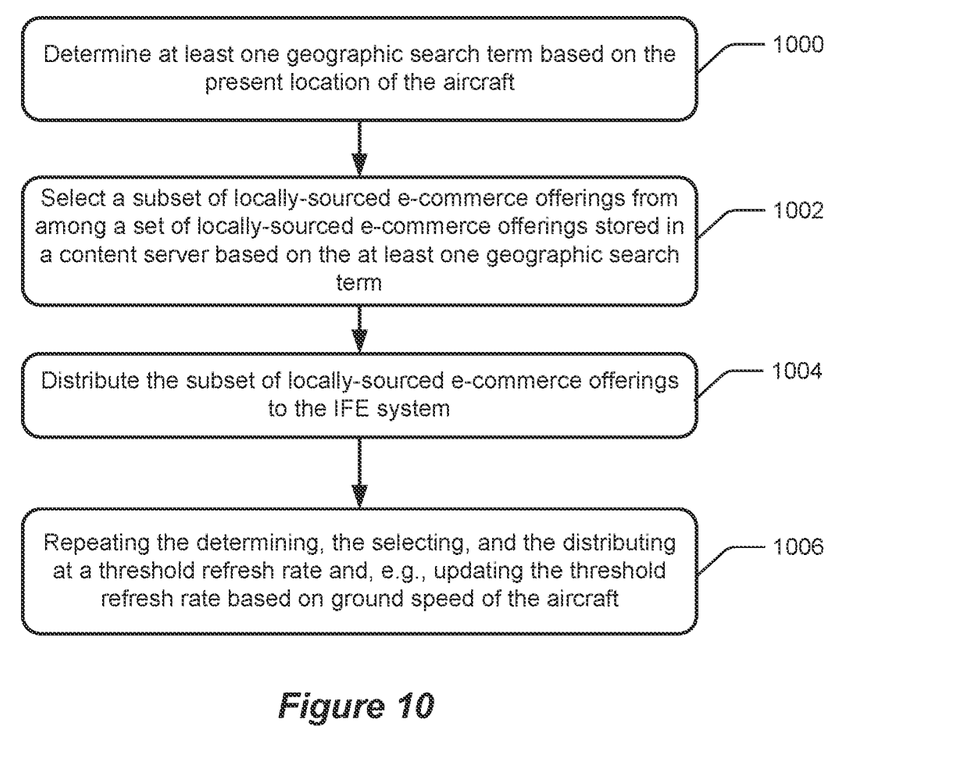

In the embodiment of FIG. 10, the content curation platform 100 determines 1000 at least one geographic search term based on the present location of the aircraft 110. The content curation platform 100 selects 1002 a subset of locally-sourced e-commerce offerings from among a set of locally-sourced e-commerce offerings stored in a content server based on the at least one geographic search term. The set of locally-sourced e-commerce offerings are stored in data structures which define geographic relevance areas associated with the locally-sourced e-commerce offerings. The subset of locally-sourced e-commerce offerings is selected based on the associated geographic relevance areas satisfying the relevance rule relative to the present location of the aircraft. The content curation platform 100 distributes 1004 the subset of locally-sourced e-commerce offerings to the IFE system 200. The content curation platform 100 repeats 1006 the determining 1000, the selecting 1002, and the distributing 1004 at a threshold refresh rate. The threshold refresh rate may be updated (computed) based on an updated ground speed of the aircraft.

In one illustrative example, as the plane flies within a threshold distance of Kansas City, the content curation platform 100 can responsively identify locally-sourced e-commerce offerings from Kansas City including food (e.g., barbeque, sauces, etc.), clothing, realty firm services, residential and/or commercial builder services, accounting firm services, law firm services, medical hospital services, etc. The e-commerce product offerings may provide selectable links that enable interested passengers to obtain more persistent access to retrieval and participate in the offers later in the flight or after completion of the flight, e.g., via the passengers' phones or computers, after those offerings are removed as the aircraft's updated location becomes sufficiently remote to satisfy a content removal rule (e.g., aircraft beyond a threshold range, content has been made available for a threshold time, etc.). Although various embodiments are described in the content of removing content, the content may be effectively removed from being accessible to passengers by deleting the content from memory accessible to the IFE system or by disabling passenger access to the content. Disabling passenger access to certain content while continuing to retain the content in memory can enable more efficient access to the content if or when it becomes geographically relevant again, such as during a return flight.

Linking passengers in this manner to e-Commerce offerings for products and/or services that are locally sourced relative to the present location of the aircraft can create new ways for business to gain potential customer visibility and may enable new revenue generating opportunities for those businesses and the airlines and/or other contracting parties.

Selection of Content of Geographically-Local Social Media Group:

The content curation platform 100 may be configured to provide content that is associated with a social media group that is geographically local to the present location of the aircraft. For example, the platform 100 may identify a town-run social media site that has a sub-site that is used by town residents and/or other designated official for communicating with passengers of aircraft who are traveling near their town. Similar social media sites may be hosted by schools, communities, businesses, etc. who want to post information (e.g., text, video, audio, etc.) for such passengers, and may enable more interactive communication where passengers can post information and have text message communications back and forth from users on the ground. Because passengers who are accessing such media sites can be verified (known passenger identity and contact information) and tracked through the airlines and similarly persons accessing the ground-based social media sites can be verified and tracked through the social media sites' verification and restricted access processes, the risk of offensive conduct can be prevented or minimized. Data Privacy aspects of identity and contact information can be taken into account.

Figure 11:
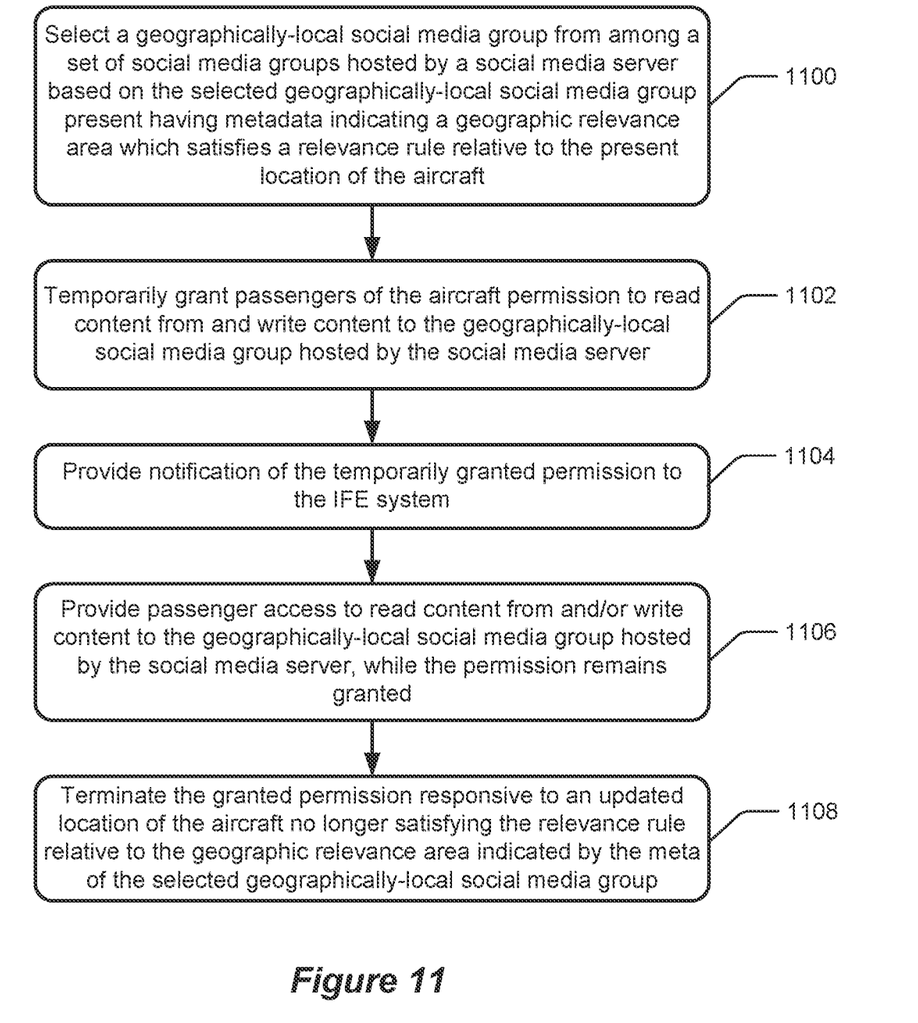

In the embodiment of FIG. 11, the content curation platform 100 selects 1100 a geographically-local social media group from among a set of social media groups hosted by a social media server based on the selected geographically-local social media group present having metadata indicating a geographic relevance area which satisfies a relevance rule relative to the present location of the aircraft 110. The content curation platform 100 temporarily grants 1102 passengers of the aircraft 110 permission to read content from and/or write content to the geographically-local social media group hosted by the social media server. The content curation platform 100 provides 1104 notification of the temporarily granted permission to the IFE system 200 which in-turn can inform passengers. The content curation platform 100 provides 1106 passenger access to read content from and/or write content to the geographically-local social media group hosted by the social media server, while the permission remains granted. The content curation platform 100 terminates 1108 the granted permission responsive to an updated location of the aircraft no longer satisfying the relevance rule relative to the geographic relevance area indicated by the meta of the selected geographically-local social media group.

In this manner, passengers are temporarily granted access to content, e.g., postings, of a geographically-local social media group while the location of the aircraft continues to satisfy a relevance rule relative to the geographic relevance area of the social media group. The access is terminated when the aircraft travels beyond the geographic relevance area. These operations can enable communities, schools, and business to communicate well-wishes and other message to passengers and may enable passengers to respond with their messages. The content provided by social media group and/or by the passengers may include contacts and/or other links that enable communications to continue after permissions have been terminated 1108.

Figure 12:
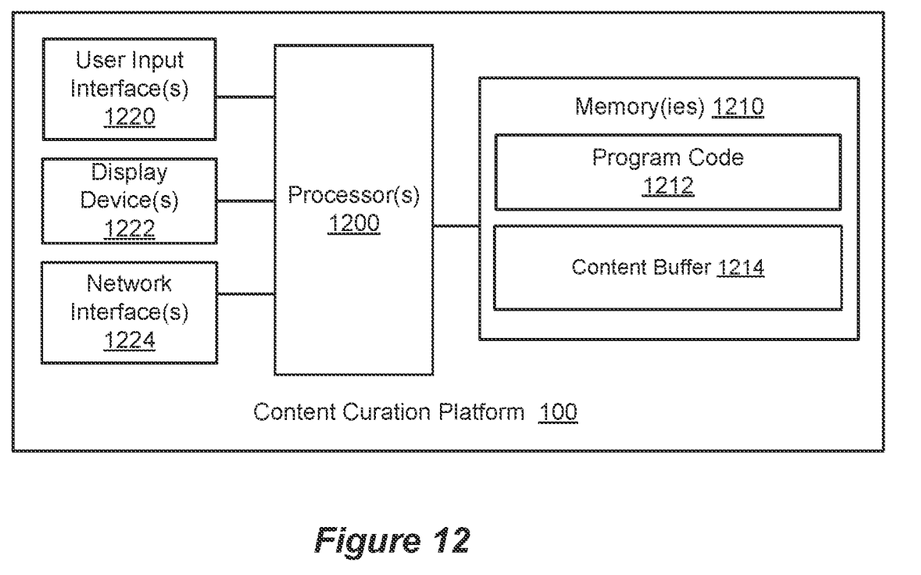
FIG. 12 is a simplified block diagram of components that may be included in a ground-based content curation platform and configured to operate according to some embodiments.

Simplified Block Diagram of Ground-Based Content Curation Platform:

FIG. 12 is a simplified block diagram of components that may be included in a ground-based content curation platform 100 and configured to operate according to some embodiments. The content curation platform 100 includes at least one processor (processor) 1200, at least one memory (memory) 1210 containing program code 1212, and at least one network interface (network interface) 1224. The processor 1200 includes one or more data processing circuits, such as a general purpose and/or special purpose processor (e.g., microprocessor and/or digital signal processor). The processor 1200 is configured to execute the program code 1212 in the memory 1210, described below as a computer readable medium, to perform some or all of the operations and methods that are described herein for one or more of the embodiments. The memory 1210 may include an internal or external content buffer 1214 where geographically-relevant content that is identified can be temporarily stored for further processing, e.g., filtering, and distribution to the IFE system 200 of the aircraft 110. The program code 1212 may operate to provide the content to the IFE system 200 as streaming channels, by on-demand delivery, etc. as explained above. The network interface 1220 may connect through the ground networks 170 with various content servers and may connect directly to the RAN 102 or via the ground networks 170. The platform 100 may be located on a single network server or may be distributed across more than one server. The platform may include a display device 1222 and a user input interface 1220 (e.g., touch screen interface, switches, control wheels, buttons, keypad, keyboard, etc.).

FURTHER EMBODIMENTS AND DEFINITIONS

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another node, it can be directly connected, coupled, or responsive to the other element or intervening element may be present. In contrast, when an element is referred to as being "directly connected", "directly coupled", "directly responsive", or variants thereof to another element, there are no intervening element present. Like numbers refer to like element throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A ground-based content curation platform comprising:
at least one network interface;
at least one processor connected to communicate through the at least one network interface; and
at least one memory storing instructions executable by the at least one processor to perform operations comprising:
obtain a present location of an aircraft;
identify geographically-relevant content having metadata indicating a geographic relevance area which satisfies a relevance rule relative to the present location of the aircraft;
distribute the geographically-relevant content to an inflight entertainment (IFE) system of the aircraft for local storage and access by passengers, wherein the geographically-relevant content is distributed through the at least one network interface and routed through a satellite radio communication system or a terrestrial radio communications system;
repeat the identification of geographically-relevant content and the distribution of the geographically-relevant content to initiate replacement of the geographically-relevant content at the IFE system, based on a threshold change in location of the aircraft;
computing a maximum text length, a maximum video playout time, or a content expiration time, based on a present ground speed of the aircraft;
filtering content of the selected content server based on at least one rule that removes any sub-content having a text content length greater than the maximum text length, a video playout time greater than the maximum video playout time, or any sub-content that was initially published or initially made available from the server more than the content expiration time before a present time of day from being included in the filtered content; and
distributing the filtered content to the IFE system of the aircraft via relay through the satellite communication system or the terrestrial communications system.

2. The ground-based content curation platform of claim 1, wherein the operations further comprise:
sending a message to the IFE system of the aircraft to initiate removal of the geographically-relevant content from the local storage, responsive to an updated location of the aircraft no longer satisfying the relevance rule relative to the geographic relevance area of the geographically-relevant content.

3. The ground-based content curation platform of claim 2, wherein the operations further comprise:
computing a threshold time the content is to be available for access by the passengers through the IFE system, based on present aircraft ground speed,
wherein the sending of the message to the IFE system of the aircraft to initiate removal of the geographically-relevant content from the local storage and terminate access by the passengers, is further based on expiration of the threshold time.

4. The ground-based content curation platform of claim 3, wherein the operations further comprise:
further computing the threshold time the geographically-relevant content is to remain available for access by the passengers through the IFE system, based on the present aircraft ground speed and an estimate of total time needed to complete the identification of the geographically-relevant content and the distribution of the geographically-relevant content to the IFE system of the aircraft.

5. The ground-based content curation platform of claim 1, further comprising:
computing a ground segment based on the present location of the aircraft and a flight path of the aircraft,
wherein the geographically-relevant content is identified based on the metadata indicating a geographic relevance area which is intersected by the ground segment; and
initiating replacement of the geographically-relevant content at the IFE system based on the geographic relevance area not being intersected by an updated ground segment computed based on an updated location of the aircraft and an updated flight path of the aircraft.

6. The ground-based content curation platform of claim 1, wherein the operations to identify geographically-relevant content having metadata indicating a geographic relevance area which satisfies the relevance rule relative to the present location of the aircraft, comprise:
determining at least one geographic search term based on the present location of the aircraft; and
operating a search engine to query content servers using the determined at least one geographic search term to identify geographically-relevant content for distribution to the IFE system of the aircraft,
wherein the operations of the search engine to query content servers using the determined at least one geographic search term to identify geographically-relevant content for distribution to the IFE system of the aircraft, comprise:
selecting a content server from among a list of content servers based on the selected content server having metadata indicating a geographic relevance area which satisfies the relevance rule relative to the present location of the aircraft; and
querying the selected content server to select the geographically-relevant content for distribution to the IFE system of the aircraft.

7. The ground-based content curation platform of claim 1, wherein the operations to identify geographically-relevant content having metadata indicating a geographic relevance area which satisfies the relevance rule relative to the present location of the aircraft, comprise:
determining at least one geographic search term based on the present location of the aircraft; and
operating a search engine to query content servers using the determined at least one geographic search term to identify geographically-relevant content for distribution to the IFE system of the aircraft,
wherein operations of the search engine to query content servers using the determined at least one geographic search term to identify geographically-relevant content for distribution to the IFE system of the aircraft, comprise:
querying at least two of: online publications site servers; Resource Description Framework (RDF) Site Summary (RSS) web feed servers; social media site servers; and photo sharing site servers, using the determined at least one geographic search term to identify geographically-relevant content for distribution to the IFE system of the aircraft.

8. The ground-based content curation platform of claim 1, wherein the computing the maximum text length, the maximum video playout time, or the content expiration time comprises computing the maximum video playout time based on the present ground speed of the aircraft; and
wherein the filtering content of the selected content server based on at least one rule that removes any sub-content having the text content length greater than the maximum text length, the video playout time greater than the maximum video playout time, or any sub-content that was initially published or initially made available from the server more than the content expiration time before the present time of day from being included in the filtered content comprises filtering content of the selected content server based on at least one rule that removes any sub-content having the video playout time greater than the maximum video playout time from being included in the filtered content.

9. The ground-based content curation platform of claim 1, wherein the computing the maximum text length, the maximum video playout time, or the content expiration time comprises computing the content expiration time based on the present ground speed of the aircraft; and
wherein the filtering content of the selected content server based on at least one rule that removes any sub-content having the text content length greater than the maximum text length, the video playout time greater than the maximum video playout time, or any sub-content that was initially published or initially made available from the server more than the content expiration time before the present time of day from being included in the filtered content comprises filtering content of the selected content server based on at least one rule that removes any sub-content that was initially published or initially made available from the server more than the content expiration time before the present time of day.

10. The ground-based content curation platform of claim 9,
wherein the operations to identify geographically-relevant content having metadata indicating a geographic relevance area which satisfies the relevance rule relative to the present location of the aircraft, comprises:
determining at least one geographic search term based on the present location of the aircraft;
selecting geographically-relevant gaming content from a content server based on the at least one geographic search term;
distributing the selected geographically-relevant gaming content to the IFE system; and
repeating the determining, the selecting, and the distributing at a threshold refresh rate.

11. The ground-based content curation platform of claim 10, wherein the operations further comprise:
updating the threshold refresh rate based on an updated ground speed of the aircraft.

12. The ground-based content curation platform of claim 1,
wherein the operations to identify geographically-relevant content having metadata indicating a geographic relevance area which satisfies the relevance rule relative to the present location of the aircraft, comprise:
determining at least one geographic search term based on the present location of the aircraft;
selecting a subset of locally-sourced e-commerce offerings from among a set of locally-sourced e-commerce offerings stored in a content server based on the at least one geographic search term, wherein the set of locally-sourced e-commerce offerings are stored in data structures which define geographic relevance areas associated with the locally-sourced e-commerce offerings, and the subset of locally-sourced e-commerce offerings is selected based on the associated geographic relevance areas satisfying the relevance rule relative to the present location of the aircraft;

distributing the subset of locally-sourced e-commerce offerings to the IFE system; and repeating the determining, the selecting, and the distributing at a threshold refresh rate.

13. The ground-based content curation platform of claim 12, wherein the operations further comprise:

updating the threshold refresh rate based on updated ground speed of the aircraft.

14. The ground-based content curation platform of claim 9, wherein the operations to identify geographically-relevant content having metadata indicating a geographic relevance area which satisfies the relevance rule relative to the present location of the aircraft, comprise:

selecting a geographically-local social media group from among a set of social media groups hosted by a social media server based on the selected geographically-local social media group present having metadata indicating a geographic relevance area which satisfies a relevance rule relative to the present location of the aircraft;

temporarily granting passengers of the aircraft permission to read content from and/or write content to the geographically-local social media group hosted by the social media server;

providing notification of the temporarily granted permission to the IFE system;

providing passenger access to read content from and/or write content to the geographically-local social media group hosted by the social media server, while the permission remains granted; and terminating the granted permission responsive to an updated location of the aircraft no longer satisfying the relevance rule relative to the geographic relevance area indicated by the meta of the selected geographically-local social media group.

* * * * *